(12) United States Patent
Brown

(10) Patent No.: US 7,554,450 B2
(45) Date of Patent: Jun. 30, 2009

(54) INTEGRATED PART TRACKING SYSTEM

(75) Inventor: Rork S. Brown, Stafford Springs, CT (US)

(73) Assignee: United Technologies Corporation, Hartford, CT (US)

(*) Notice: Subject to any disclaimer, the term of this patent is extended or adjusted under 35 U.S.C. 154(b) by 247 days.

(21) Appl. No.: 11/363,638

(22) Filed: Feb. 28, 2006

(65) Prior Publication Data
US 2007/0200704 A1 Aug. 30, 2007

(51) Int. Cl.
*G08B 13/14* (2006.01)
(52) U.S. Cl. .............. 340/572.7; 235/494; 343/700 MS
(58) Field of Classification Search .............. 340/572.1, 340/572.7, 5.92, 505, 10.1; 705/28; 235/385, 235/494; 343/700 MS, 878, 907, 772
See application file for complete search history.

(56) References Cited

U.S. PATENT DOCUMENTS

| | | | |
|---|---|---|---|
| 6,104,349 A | 8/2000 | Cohen | |
| 6,127,977 A | 10/2000 | Cohen | |
| 6,140,975 A | 10/2000 | Cohen | |
| 6,445,352 B1 | 9/2002 | Cohen | |
| 6,452,553 B1 | 9/2002 | Cohen | |
| 6,476,766 B1 | 11/2002 | Cohen | |
| 6,480,699 B1* | 11/2002 | Lovoi | 455/41.2 |
| 6,985,122 B2* | 1/2006 | Cohen | 343/700 MS |
| 7,284,704 B2* | 10/2007 | Lubow | 235/494 |
| 2004/0124248 A1* | 7/2004 | Selker | 235/492 |
| 2004/0203478 A1* | 10/2004 | Scott | 455/70 |
| 2004/0247874 A1* | 12/2004 | Ryzi et al. | 428/410 |
| 2006/0055540 A1* | 3/2006 | Lawrence et al. | 340/572.7 |
| 2007/0040680 A1* | 2/2007 | Chiu | 340/572.1 |

FOREIGN PATENT DOCUMENTS

EP 1 515 392 A2 3/2005

* cited by examiner

*Primary Examiner*—Thomas J Mullen
(74) *Attorney, Agent, or Firm*—Carlson, Gaskey & Olds PC

(57) ABSTRACT

An identification system includes a fractal antenna fashioned as a 2-dimensional data matrix which defines a Unique Item Identifier which operates as a conventional active antenna element for a RFID identification system while the unique face of the antenna is utilized as a physical reference to distinguish the component. By utilizing the face of an antenna as a Unique Item Identifier, an RFID system component antenna integrates two identification systems.

17 Claims, 3 Drawing Sheets

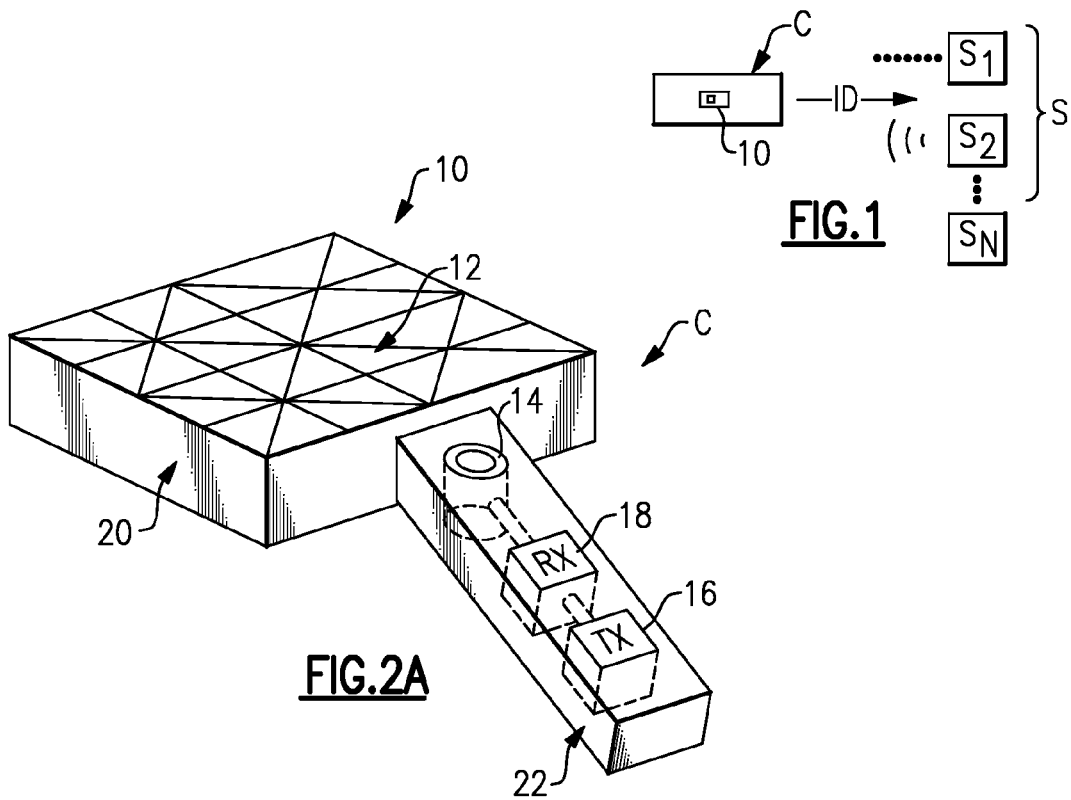
FIG. 1
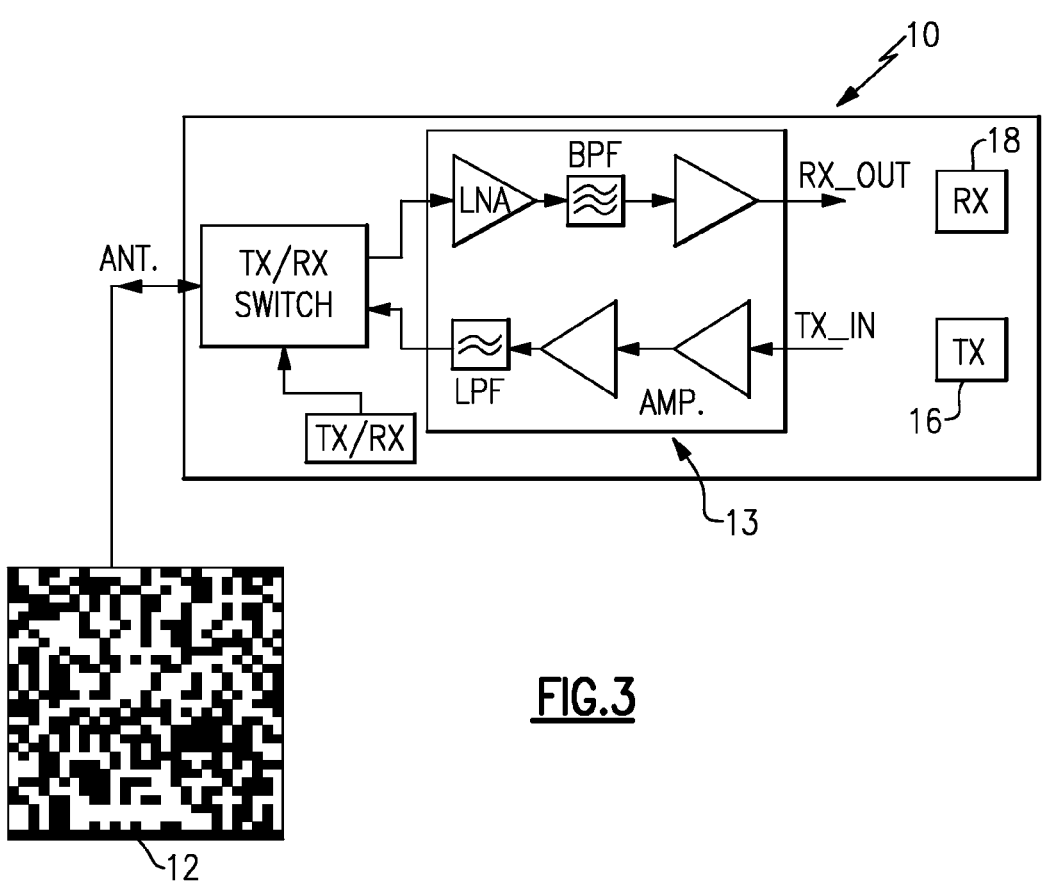
FIG. 2A
FIG. 3

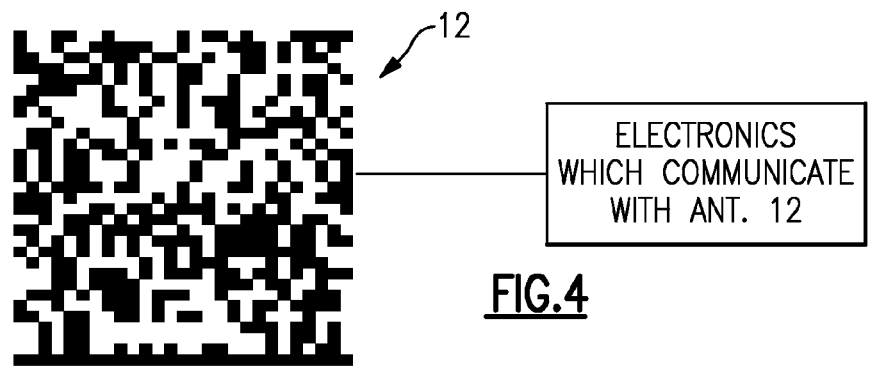
FIG. 4
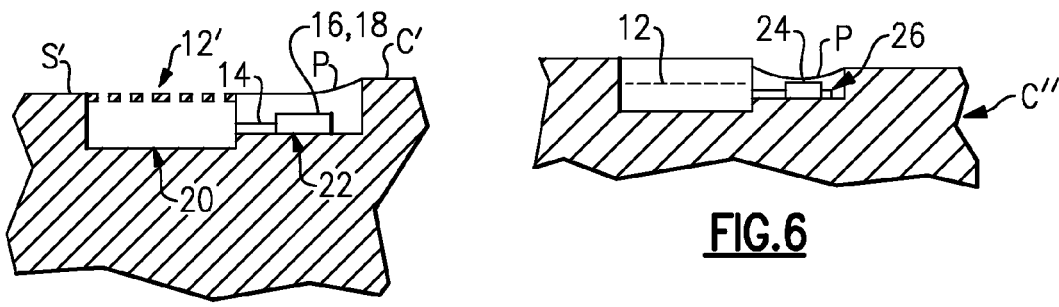
FIG. 5
FIG. 6
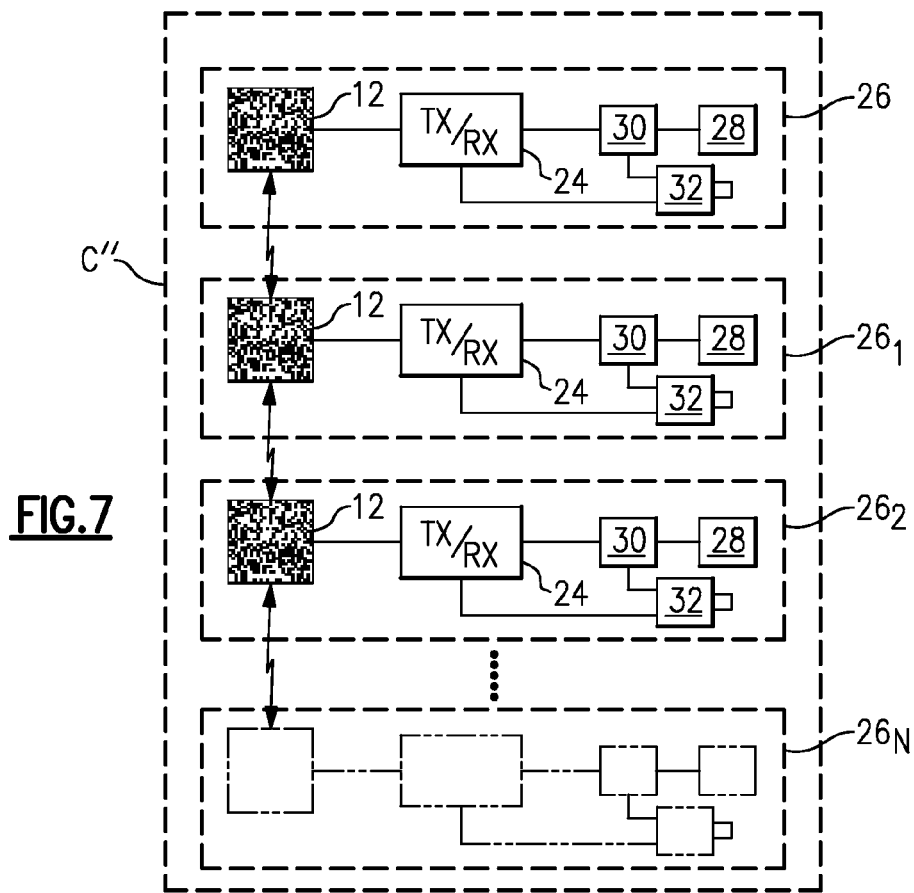
FIG. 7

INTEGRATED PART TRACKING SYSTEM

BACKGROUND OF THE INVENTION

The present invention relates to a part tracking system, and more particularly to an embedded antenna which combines both Unique Identification and Radio Frequency Identification (RFID) as well as embedded sensor communications.

Various systems are utilized for part tracking. Two such systems are Unique Identification (UID) and Radio Frequency Identification (RFID).

Unique Identification (UID) of items is accomplished by marking each qualifying item with a permanent 2-dimensional data matrix. The data matrix is encoded with the data elements necessary to construct a Unique Item Identifier (UII) which is globally unique and unambiguous. The data elements required to form a UII may include the manufacturer's identification (i.e. cage code), in process measurements and the item's serial number. If the manufacturer serializes within part number, that data element may also be encoded. Because the data matrix is machine-readable, UID marking greatly reduces human error and improves the accuracy of inventory and acquisition records.

Radio Frequency Identification (RFID) is an automatic identification method, relying on storing and remotely retrieving data using devices called RFID tags or transponders. RFID tags contain silicon chips and antennas to enable them to receive and respond to radio-frequency queries from an RFID transceiver.

Oftentimes one or both of a UII and RFID tag are attached to a single part. Such tracking is oftentimes utilized for relatively expensive components such as gas turbine engine components and may, in fact, be mandated by government organizations or other end users of the part. Although effective, usage of identification tags for both systems on each part may be duplicative and relatively expensive. Furthermore, the identification tags may be inadvertently stripped from the part rendering the part unidentifiable by one or both of the systems.

Accordingly, it is desirable to provide a cost effective and tamper resistant part tracking system which incorporates both UID and RFID capabilities.

SUMMARY OF THE INVENTION

An identification system according to the present invention includes a fractal antenna fashioned as a 2-dimensional data matrix which defines a Unique Item Identifier which operates as a conventional active antenna element for a RFID identification system while the unique face of the antenna is utilized as a physical reference to distinguish the component. By utilizing the face of an antenna as a Unique Item Identifier, an RFID system component antenna integrates two identification systems.

The Unique Item Identifier may alternatively be formed directly into the surface of the component. That is, the component includes a waveguide cavity of which at least one surface of the component itself forms a surface of the antenna.

The present invention therefore provides a cost effective and tamper resistant part tracking system which incorporates both UID and RFID capabilities.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general schematic view of an identification system;

FIG. 2A is a schematic perspective view of a component having an identifier capable of identification with an identification system;

FIG. 3 is a schematic electronic diagram of an identifier capable of identification with an identification system;

FIG. 4 is a plan view of a fractal antenna fashioned as a 2-dimensional data matrix which defines a Unique Item Identifier;

FIG. 5 is a sectional view of a fractal antenna formed into a surface of a component;

FIG. 6 is a sectional view of another fractal antenna mounted into a component; and FIG. 7 is a schematic block diagram of a sensor system utilizing a fractal antenna according to the present invention.

DETAILED DESCRIPTION OF THE PREFERRED EMBODIMENT

FIG. 1 illustrates a general perspective view of a component C having an identifier 10 capable of identification with multiple identification systems S (illustrated schematically at $S_1$-$S_n$), which communicate with the identifier 10 in various ways. The identifier 10 functions with both a Unique Identification (UID) and Radio Frequency Identification (RFID) and is herein represented by the identification system 10. It should be understood that various other identification systems will likewise benefit from the present invention.

Figure 2B:
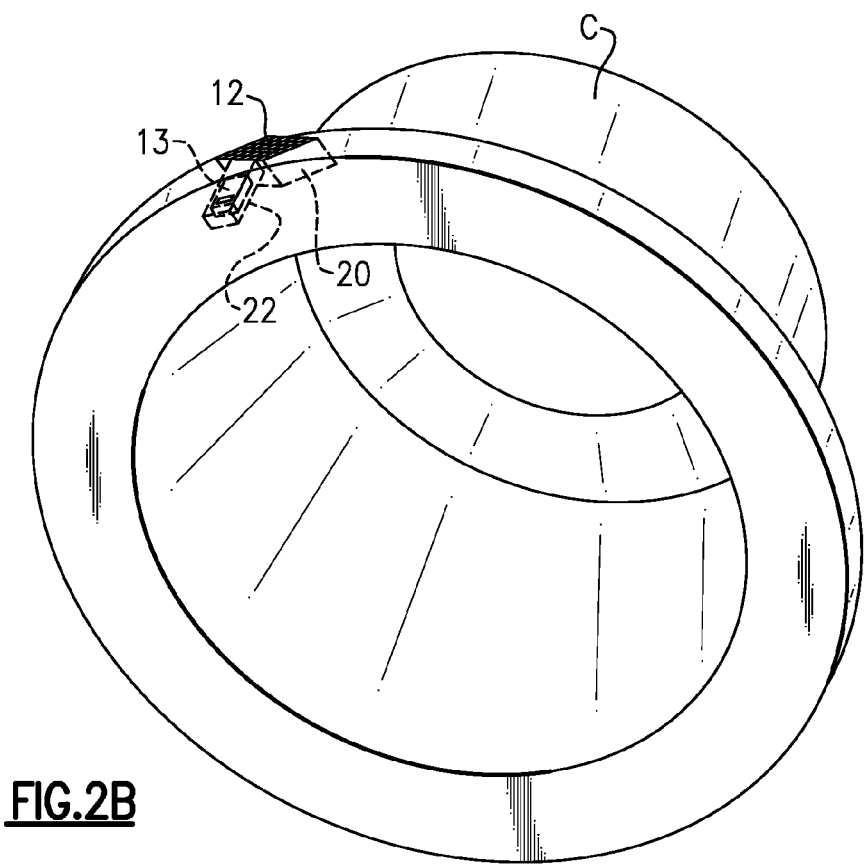
FIG. 2B is an environmental exploded view of the component having an identifier capable of identification with an identification system.
Figure 2C:
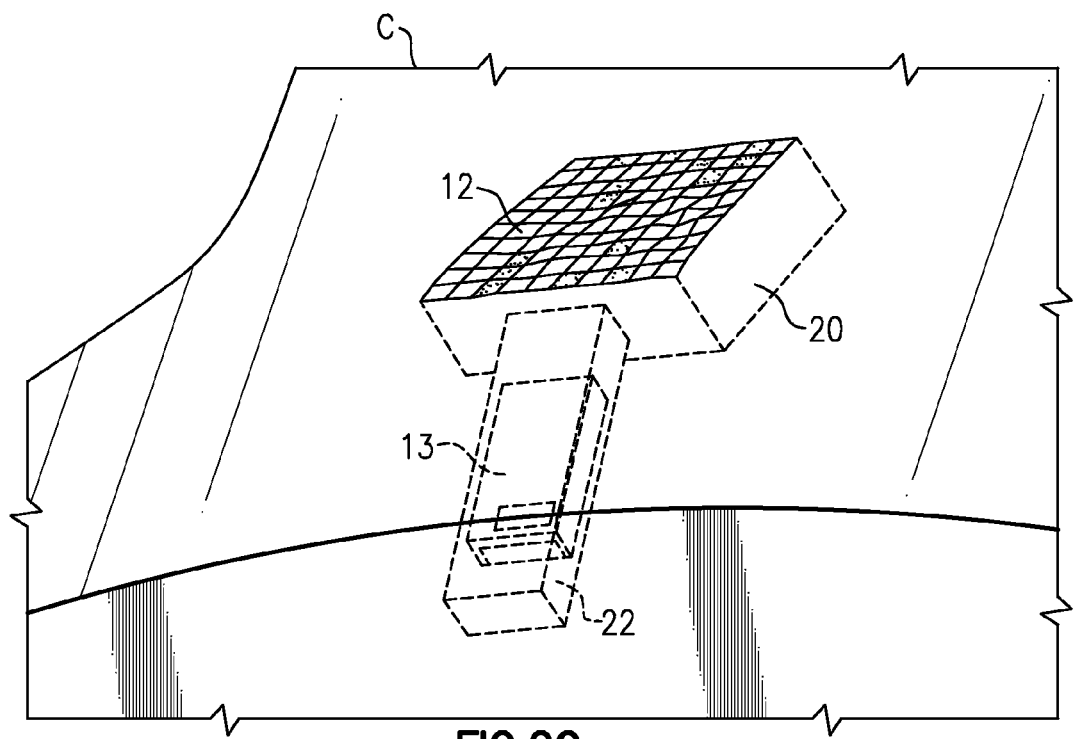
FIG. 2C is an expanded environmental exploded view of the component having an identifier capable of identification with an identification system.

Referring to FIG. 2A, the identifier 10 may be integral with the component C (also illustrated in FIGS. 2B and 2C). The identifier 10 generally includes an antenna 12, and electronic components 13 such as a microwave feed element 14, at transmitter (TX) 16 and a receiver (RX) 18 in communication therewith (illustrated schematically at FIG. 3). It should be understood that the identifier is illustrated somewhat schematically and that other electronic components such as power supplies and the like may also be utilized herewith. Furthermore, the backend electronic components may include such components as a radio connected to a microprocessor. It is the variation in the antenna and the ability to transmit and receive that makes this a powerful RFID solution. A cellular communication system may alternatively or additionally be utilized with the electronics package with the antenna as the distinguishing characteristic of the assembly.

The antenna 12 is located adjacent a waveguide cavity 20 while the remaining components of the identifier 10 are located within an electronics cavity 22. The waveguide cavity 20 and the electronics cavity 22 are preferably machined directly into the component C such that the identifier is integral thereto. Alternatively, the identifier is a separate assembly which is attached to the component C.

The antenna 12 may be fabricated as two spaced-apart metal surfaces separated by a small width dielectric. The sides are dimensioned typically one-quarter wavelength or one-half wavelength at the frequency of interest. One surface may be of a fractal geometry, while the other side is a ground plane to form a fractal antenna. Generally, fractal antennas have been used in printed circuit technology, however, they may alternatively be metal plate arrays, such as monopulse antenna technology. Fractal versions of all existing antenna types may be utilized, including dipole, monopole, patch, conformal, biconical, discone, spiral, helical and others, as well as compact variants of each. Examples of the antenna type and construction usable with the present invention may vary from hollowed metal waveguide within the component to dielectric/ceramic patch antenna electrically fed by microstrip lines. The root intelligence of such an assembly typically resides in the attached microprocessor.

A fractal element antenna is shaped using fractal geometry. A fractal is "self similar"—a complex pattern built from the repetition of a simple shape. The inherent qualities of fractals enable the production of high performance antennas that are typically 50 to 75 percent smaller than traditional ones. It should be understood that various known manufacturing methods may be utilized to manufacture the antenna 12. Rather than being a complex pattern built from the repetition of a simple shape such as a Serpinsky triangle or Serpinsky carpet as, for example only, manufactured by Fractal Antenna Systems, Inc. of Bedford, Mass. USA, the fractal antennas 12 of the present invention are fashioned as a 2-dimensional data matrix which defines a Unique Item Identifier (UII; FIG. 4). That is, the fractal antenna 12 operates as a conventional active fractal antenna element of, for example only, an RFID identification system $S_2$ (FIG. 1) in which the microwave feed element 14, the TX 16 and RX 18 communicate through the antenna 12, while the unique face of the antenna 12 is utilized as a physical reference to distinguish the component C through the identification system $S_1$ (FIG. 1) as generally understood. In other words, the face of the antenna 12 according to the present invention provides a 2-dimensional matrix which represents component information such as date of manufacture, part number, serial number, and the like.

The antenna 12 is preferably mounted over the waveguide cavity 20 while the electronic components are mounted adjacent thereto in the electronics cavity 22. The identifier 10 is thereby integrated into the component C itself. Such integration minimizes tampering and the potential for damage to the identifier 10.

Referring to FIG. 5, the 2-dimensional data matrix which defines the Unique Item Identifier may alternatively be formed directly into the surface S' of the component C'. That is, the component C' includes a waveguide cavity 20 in which at least one layer which forms the antenna 12' is the surface S' of the component C' itself. Such cavity and antenna structure—being relatively minute—may be readily manufactured by various machining and printed circuit technologies known in the art. The electronics such as the feed element 14, the TX 16, and RX 18 may then be located in the electronics cavity 22 and encased therein with, for example, a potting compound P.

In another embodiment, the antenna 12' may be manufactured from ceramic materials which may then be mounted into the waveguide cavity (FIG. 6).

Referring to FIG. 6, an embedded antenna 12 as described above, may be utilized with a TX/RX subsystem 24 to provide a sensor system 26 for a component C". The sensor system 26 generally includes a sensor 28, a controller 30, and a power source 32 in communication with the TX/RX subsystem 24 (FIG. 7). The sensor system 26 may thereby be embedded into the component C" which may be for example only, a gas turbine engine to form a sensor network in communication with other sensor systems $26_1, 26_2, \ldots 26_N$ likewise situated. The sensor network thereby provides a robust embedded sensor system for various components deep within a component C" such as the noted gas turbine engine. System data from the network of sensors is thereby readily available in a wireless manner.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An identifier for an identification system comprising: a fractal antenna forming a 2-dimensional data matrix.

2. The identifier as recited in claim 1, wherein said data matrix includes a 2-dimensional data matrix which defines a Unique Item Identifier.

3. The identifier as recited in claim 1, wherein said fractal antenna is formed through a surface of a component.

4. The identifier as recited in claim 3, further comprising a waveguide cavity formed within the component adjacent said fractal antenna.

5. The identifier as recited in claim 1, further comprising a microwave element in communication with said fractal antenna.

6. The identifier as recited in claim 5, further comprising a waveguide cavity formed within a component adjacent said fractal antenna, said microwave element mounted within an electronics cavity adjacent said waveguide cavity.

7. The identifier as recited in claim 6, wherein said microwave element comprises a microwave feed element within said electronics cavity.

8. The identifier as recited in claim 6, further comprising a receiver in electrical communication with said microwave element within said electronics cavity.

9. The identifier as recited in claim 6, further comprising a transmitter in electrical communication with said microwave element within said electronics cavity.

10. The identifier as recited in claim 9, further comprising a sensor in electrical communication with a controller, said controller in electrical communication with said transmitter.

11. The identifier as recited in claim 1, further comprising:
a waveguide cavity formed within a component adjacent said fractal antenna;
an electronics cavity adjacent said waveguide cavity;
a sensor mounted within said electronics cavity; and
a controller in electrical communication with said sensor.

12. The identifier as recited in claim 11, further comprising:
a transmitter in electrical communication with said controller;
a microwave feed element in electrical communication with said transmitter and said fractal antenna to communicate data from said sensor.

13. A component with an identification system comprising:
a waveguide cavity formed within the component;
a fractal antenna adjacent said waveguide cavity, said fractal antenna defining a Unique Item Identifier;
an electronics cavity forming a 2-dimensional data matrix adjacent said waveguide cavity; and
a microwave element for communication through said fractal antenna.

14. The part as recited in claim 13, wherein said fractal antenna is formed at least partially through a surface of the component.

15. A method of part identification comprising:
communicating data through a fractal antenna of a radio frequency identification system in a surface of a component, the fractal antenna forming a 2-dimensional data matrix as an identifier for an identification system; and
determining the Identifier from the communicated data.

16. A method as recited in claim 15, further comprising the step of:
communicating sensor data through the fractal antenna.

17. A method as recited in claim 15, further comprising the step of:
forming a network of sensors with a multitude of sensors, each of the multitude of sensors mounted within a respective component of a system, each of the multitude of sensors in wireless communication with at least one other of the multitude of sensors.

* * * * *